April 19, 1932. A. KADOW 1,854,408
MACHINE FOR FORMING GLASS ARTICLES
Filed March 5, 1929
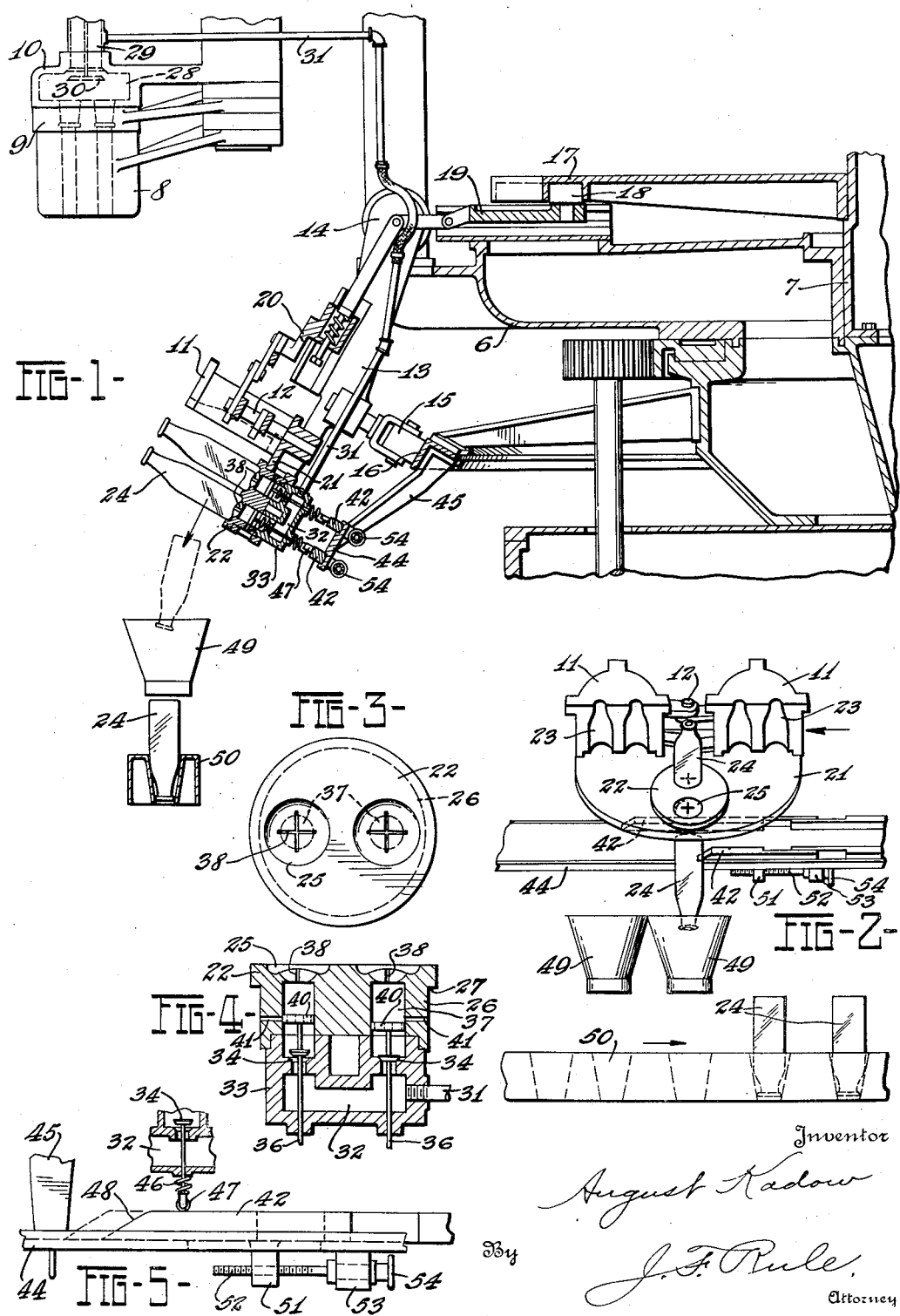

Patented Apr. 19, 1932

1,854,408

UNITED STATES PATENT OFFICE

AUGUST KADOW, OF TOLEDO, OHIO, ASSIGNOR TO OWENS-ILLINOIS GLASS COMPANY, OF TOLEDO, OHIO, A CORPORATION OF OHIO

MACHINE FOR FORMING GLASS ARTICLES

Application filed March 5, 1929. Serial No. 344,132.

My invention relates to machines for forming bottles or other glass articles in molds, and particularly to means for controlling the discharge of the articles from the molds. The invention is specially adapted for machines of the type in which the formed articles are dropped from the machine by gravity after the finishing molds open. In machines of this type, it is customary to hold the bottles or other articles in position on the mold bottoms during the opening of the finishing molds so that the bottles will not be pulled to one side or displaced by the opening movement of the mold sections. In the Owens type of machines, to which the invention is herein shown as applied, it is customary to hold the bottle during the initial opening movement of the finishing mold by means of a so-called "knock-out" arm. This arm carries a disk which engages the neck end of the bottle during the initial opening movement of the mold and is then lifted to release the bottle, permitting it to drop by gravity from the machine.

An object of the present invention is to provide improved means for holding the bottles during the opening of the finishing molds. For this purpose, provision is made for temporarily holding the bottles on the mold bottom plates by suction applied thru suitable openings in said bottom plates. In this manner the usual "knock-out" arm or other device which mechanically engages or holds the bottle for the purpose indicated, is dispensed with.

Other objects of the invention will appear hereinafter.

In the accompanying drawings:

Fig. 1 is a fragmentary sectional view partly diagrammatic, of a bottle blowing machine to which the present invention is applied.

Fig. 2 is a front elevation showing an open finishing mold, bottom plate and cams controlling the application of suction.

Fig. 3 is a face view of the mold bottom plate.

Fig. 4 is a section thru the bottom plate and the valve box therebeneath.

Fig. 5 is a detail view illustrating an adjustable cam controlling one of the suction valves.

The invention is herein illustrated as applied to an Owens type of bottle machine such as shown, for example, in the patent to LaFrance, Number 1,185,687, patented June 6, 1916. In the present drawings, however, the machine is shown as provided with plural cavity molds. The machine comprises a mold carriage 6 which is rotated continuously about a central stationary column 7. Mounted on the carriage to rotate therewith are a plurality of units each comprising a blank mold 8, a neck mold 9 and a blow head 10. Cooperating with each blank mold is a finishing mold comprising separable sections 11 mounted to swing about a hinge pin 12 for opening and closing the mold. The finishing mold is carried on a frame 13 having a pivotal connection at 14 with the mold carriage. The frame 13 carries a roll 15 which runs on a stationary cam track 16 which supports the mold frame and controls its up and down movement. The opening and closing movements of the finishing mold are controlled by a stationary cam 17 on which runs a roll 18 carried by a slide 19 having operating connections 20 with the mold sections. The mold sections 11 are supported on a plate 21 during their opening and closing movements. When the mold sections are brought together they engage and surround a mold bottom plate 22. The mold sections are formed with mold cavities 23 in which the bottles 24 or other articles are blown to their final form. The bottom plate 22 is formed with recesses 25 which register with the mold cavities 23 and are suitably shaped to give the desired conformation to the bottoms of the blown articles.

The mold bottom plate 22 is removably mounted in the supporting plate 21, said bottom plate 22 being formed with a downward extension 26 of reduced diameter providing a shoulder 27 which seats on the plate 21 while the extension 26 protrudes downward thru an opening in the plate 21.

Referring to Fig. 1, the head 10 is provided with the usual suction or vacuum chamber 28 communicating with the mold cavities in the molds 8 and 9. The molds are filled with glass by suction in the usual manner by bringing them in contact with a pool of molten glass and exhausting the air from the mold cavities by opening a valve 30 and thereby connecting the chamber 28 with a pipe 29 which is in constant communication with a source of vacuum or sub-atmospheric pressure.

The suction mechanism for holding the bottles during the opening of the finishing molds will now be described. A branch pipe 31 (Fig. 1) leads from the vacuum pipe 29 to a vacuum chamber 32 (see Fig. 4) formed in a valve box 33 beneath the extension 26 of the bottom plate 22. Valves 34 carried on valve stems 36, control communication between the suction chamber 32 and valve chambers 37. Restricted openings or passageways 38 are provided between the valve chambers 37 and the bottom recesses 25 in the mold bottom plate. These passageways 38 are herein shown as narrow slits extending diametrically across the recesses 25, but it will be understood that the form and arrangement of these openings 38 may be materially modified.

Each valve stem 36 carries at its upper end a valve disk 40 which when the valve is lowered, opens the valve chamber 37 to the atmosphere thru a lateral port 41, and when the valve is lifted, closes said port 41. The disk 40 is provided with openings therethru for the passage of air. The valves 34 are controlled by stationary cam plates or tracks 42 adjustably mounted on a supporting bar 44 carried on brackets 45 attached to the cam track 16. The valves 34 are held closed by spring 46 except during the comparatively short intervals of time required for opening the finishing mold, at which time the bottles are held on the bottom plate by suction. As the mold during its rotation with the mold carriage, approaches the discharging position shown in Fig. 1, the cam 17 operates in the usual way to separate the mold sections 11. Just before the mold commences to open, the valves 34 are lifted from their seats by means of the cams 42 engaging cam rolls 47 on the lower ends of the valve stems. This establishes communication between the suction chamber 32 and the valve chambers 37 so that the air is exhausted from beneath the mold bottoms which are seated in the recesses 25, thus holding the bottles securely in position on the bottom plate while the mold opens.

As a bottle reaches the position at which it is to be discharged, the corresponding valve 34 is closed by its spring 46 as the cam roll 47 runs down the inclined end 48 of the cam track 42. This closing of the valve cuts off communication between the vacuum chamber 32 and the valve chamber 37 and opens the relief port 41 so that air pressure is admitted beneath the bottle and allows it to drop by gravity from the machine. As shown in Fig. 2, the ends of the cam tracks 42 are arranged one in advance of the other so that the bottles will be released one in advance of the other, the bottles may thus be discharged singly and in succession into individual chutes 49 thru which they are guided into individual pockets in a leer pan or holder 50 by which they are conveyed to the annealing leer.

The cam tracks 42 are individually adjustable in the direction of their length so that the point at which each bottle is released may be adjusted and controlled independently of the others. To permit such adjustment, each cam track 42 is slidably mounted on the plate 44 and is provided with a lug 51 extending downward thru a slot in the plate 44. An adjusting rod 52 is journaled in a bearing 53 on the plate 44 and held against endwise movement therein. Said rod has a screw threaded connection with the lug 51 and can be rotated by a hand wheel 54 to adjust the cam track in the direction of its length.

Altho the invention is herein illustrated as embodied in a machine comprising plural molds each adapted to form two bottles at a time, it will be understood that the invention may be used with single mold machines or machines in which each mold forms more than two articles at a time. The invention may also be used in various types of machines other than that herein shown.

Various modifications may be resorted to within the spirit and scope of the invention.

What I claim is:

1. In a machine for forming glass articles, the combination of a mold carriage, a tiltable finishing mold thereon comprising separable body sections and a bottom plate, said bottom plate adapted to support articles in upright positions, automatic means for opening the mold by separating said sections when the mold reaches a predetermined position during its travel with the carriage and leaving a molded article supported upright on the bottom plate, said bottom plate formed with an air passage therethru, a vacuum line extending from said passage to a source of vacuum, a valve in said vacuum line, said valve arranged to travel with the mold bottom, a sectional cam positioned to open said valve and thereby apply suction to said bottom plate during the opening movement of the mold, and means for adjusting one section of the cam to thereby change the length of the period of application of suction to the bottom plate.

2. In a machine for forming glass articles, the combination of a mold carriage rotatable about a vertical axis, a finishing mold thereon formed with a plurality of mold cavities, said mold comprising separable sections and a mold bottom, means for supporting the mold in an inclined position, means for separating the mold sections and leaving the molded articles supported on the inclined mold bottom, a vacuum line including air passages extending thru the mold bottom in register with the mold cavities, valves in said line, said valves mounted to travel with the mold bottom, stationary cams positioned and arranged to open said valves as the mold approaches a discharging position and thereby cause the application of suction at the bottoms of the molded articles for holding them in position on the mold bottom during the opening movement of the mold, said cams being arranged to release the valves in succession, means for closing the valves when released, and means for restoring atmospheric pressure to said air passages when the valves are closed and thereby causing the articles to be released singly and in succession and drop by gravity from the mold bottom.

3. In a machine for forming glass articles, the combination of a traveling mold, formed with a plurality of mold cavities, said mold comprising a mold bottom formed with air passages extending therethru to register with the mold cavities, a vacuum line communicating with said air passages, valves interposed between said air passages and vacuum line for controlling the exhausting of air thru said passages, stationary cams positioned and arranged to operate said valves in succession, and means for individually adjusting said cams to adjustably control the point at which, during the travel of the mold, each valve is operated.

Signed at Toledo, Ohio, this 2d day of March, 1929.

AUGUST KADOW.